(12) United States Patent
Yang (10) Patent No.: US 9,897,047 B2
(45) Date of Patent: Feb. 20, 2018

(54) APPARATUS FOR COOLING VEHICLE ENGINE AND COOLING METHOD THEREOF

(71) Applicants: HYUNDAI MOTOR COMPANY, Seoul (KR); KIA MOTORS CORPORATION, Seoul (KR)

(72) Inventor: Il Suk Yang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/215,119

(22) Filed: Jul. 20, 2016

(65) Prior Publication Data

US 2017/0107952 A1    Apr. 20, 2017

(30) Foreign Application Priority Data

Oct. 15, 2015 (KR) .................. 10-2015-0144237

(51) Int. Cl.
*F02M 26/30* (2016.01)
*F02F 7/00* (2006.01)
(Continued)

(52) U.S. Cl.
CPC .............. *F02M 26/30* (2016.02); *F01P 3/02* (2013.01); *F02F 1/16* (2013.01); *F02F 7/0021* (2013.01);
(Continued)

(58) Field of Classification Search
CPC ........ F02M 26/22; F02M 26/28–26/30; F02M 26/32; F02M 26/33; F02M 26/41; F02F 1/16; F02F 7/0021
(Continued)

(56) References Cited

U.S. PATENT DOCUMENTS

| 2006/0005791 A1* | 1/2006 | Obidi ................. F01P 3/02 123/41.29 |
| 2009/0114171 A1* | 5/2009 | Hayashi .............. F01P 3/02 123/41.44 |

(Continued)

FOREIGN PATENT DOCUMENTS

| JP | H10-2256     | 1/1998 |
| JP | 2001-132556 A | 5/2001 |

(Continued)

*Primary Examiner* — John Kwon
*Assistant Examiner* — Johnny H Hoang
(74) *Attorney, Agent, or Firm* — Brinks, Gilson & Lione (57) ABSTRACT

An apparatus for cooling a vehicle engine includes: a combustion chamber in which a piston reciprocates; water jackets in which a coolant flows to cool the combustion chamber; and a cylinder block forming a framework of an engine. In particular, the cylinder block includes: a cylinder block body in which the combustion chamber is formed, and an exhaust gas recirculation (EGR) cooler mounted in the cylinder block body such that the EGR cooler is heat-exchanged with a coolant discharged from the combustion chamber. The cylinder block body is provided with an EGR cooler insertion part, to which a coolant of the combustion chamber is supplied and the EGR cooler is inserted, and the EGR cooler is provided with a gas tube in which an exhaust gas flows. The exhaust gas of the gas tube is cooled by a coolant supplied to the EGR cooler insertion part.

11 Claims, 10 Drawing Sheets (51) Int. Cl.
*F02F 1/16* (2006.01)
*F01P 3/02* (2006.01)

(52) U.S. Cl.
CPC ..... *F01P 2003/021* (2013.01); *F01P 2060/08* (2013.01); *F01P 2060/16* (2013.01)

(58) Field of Classification Search
USPC .......... 123/41.02, 41.48 R, 41.82 R, 568.12, 123/568.17, 568.18
See application file for complete search history.

(56) References Cited

U.S. PATENT DOCUMENTS

| | | | | |
|---|---|---|---|---|
| 2012/0085300 A1* | 4/2012 | Asano | ................ | F02M 25/0735 123/41.82 R |
| 2013/0213367 A1* | 8/2013 | Grosch | ................... | F02B 37/00 123/563 |
| 2014/0352671 A1* | 12/2014 | Neal | ....................... | B23P 15/26 123/568.12 |
| 2015/0377114 A1* | 12/2015 | Matsumoto | ............... | F02F 1/14 123/41.44 |
| 2016/0025045 A1* | 1/2016 | Engineer | ................ | F02M 26/20 123/568.12 |

FOREIGN PATENT DOCUMENTS

| | | |
|---|---|---|
| JP | 2002-235607 | 8/2002 |
| JP | 2010-190064 | 9/2010 |
| JP | 2010-190064 A | 9/2010 |
| JP | 2015-129619 | 7/2015 |
| KR | 10-1999-0059344 A | 7/1999 |

* cited by examiner

APPARATUS FOR COOLING VEHICLE ENGINE AND COOLING METHOD THEREOF

CROSS-REFERENCE TO RELATED APPLICATION

This application claims the benefit of and priority to Korean Patent Application No. 10-2015-0144237, filed on Oct. 15, 2015, which is incorporated herein by reference in its entirety.

FIELD

The present disclosure relates to an apparatus for cooling a vehicle engine and a cooling system thereof.

BACKGROUND

The statements in this section merely provide background information related to the present disclosure and may not constitute prior art.

Emissions of a vehicle contain harmful materials such as carbon monoxide (CO), nitrogen oxides (NOx), hydrocarbons (HC), and the like. Among these three elements generated during the combustion process, NOx always has the opposite causal relationship with respect to CO and HC.

That is, the largest portion of NOx is generated at a point in time at which CO and HC are reduced in a practical output range. The generation of NOx is increased as fuel is completely burnt, that is, as an engine has a higher temperature.

Thus, emission allowance has been regulated as the relevant Act, and thus, various technologies have been developed to reduce emissions. Among those technologies is an exhaust gas recirculation (EGR).

According to the EGR, a partial amount of previous combustion gas (EGR gas) is supplied to a mixture intaken to a combustion chamber, while maintaining a mixing ratio as a theoretical air-fuel ratio, in order to reduce generation of NOx without rapidly increasing other harmful materials. That is, the EGR is a device used to lower a temperature of flame by increasing heat capacity of such a combustion gas.

In detail, the EGR is for recirculating an exhaust gas of the discharge gas to an intake system to lower a combustion temperature of an interior of a cylinder to suppress generation of NOx. In other words, as a means for reducing NOx of the exhaust gas, the EGR returns a partial amount of exhaust gas to the intake system to lower a highest temperature when a mixture is burnt, thus reducing generation of NOx.

Among components of the EGR system, an EGR cooler is a sort of heat-exchanger cooling an exhaust gas having a high temperature by a coolant of an engine as a refrigerant. In order to cool the EGR cooler, the EGR cooler is mounted outside of a cylinder block or outside of the engine so as to be cooled.

SUMMARY

The present disclosure provides an apparatus for cooling a vehicle engine, capable of reducing vibration generated in a vehicle or vibration generated in an engine.

An aspect of the present disclosure provides an apparatus for cooling a vehicle engine, capable of reducing man-hour due to brazing of components, while reducing a space (layout) for installation of an exhaust gas recirculation (EGR) cooler.

The present disclosure may also provide an apparatus for cooling a vehicle engine, capable of enhancing cooling efficiency of a cylinder head and an EGR cooler.

Technical subjects are not limited to the foregoing subjects and any other technical subjects not mentioned will be clearly understood by a person skilled in the art from the following description.

According to one form of the present disclosure, an apparatus for cooling a vehicle engine includes: a combustion chamber in which a piston reciprocates; water jackets in which a coolant flows to cool the combustion chamber; and a cylinder block forming a framework of an engine. The cylinder block includes: a cylinder block body in which the combustion chamber is formed; and an exhaust gas recirculation (EGR) cooler mounted in the cylinder block body such that the EGR cooler is heat-exchanged with a coolant discharged from the combustion chamber.

The cylinder block body may be provided with an EGR cooler insertion part, to which a coolant of the combustion chamber is supplied and the EGR cooler is inserted, and the EGR cooler may be provided with a gas tube in which an exhaust gas flows. The exhaust gas of the gas tube may be cooled by a coolant supplied to the EGR cooler insertion part.

The gas tube may be disposed in proximity of the cylinder block body.

The gas tube may include a plurality of gas tubes and may have a U shape.

The gas tube may include an intake port through which an exhaust gas is introduced, a heat exchange portion bent and extending from the intake port, and an exhaust port bent and extending from the heat exchange portion and allowing the exhaust gas introduced through the intake port to be discharged.

The EGR cooler may include a cooler cover covering the EGR cooler insertion part and the gas tube mounted on the cooler cover, and the cooler cover may communicate with the intake port and the exhaust port of the gas tube. An exhaust gas flowing in the heat exchange portion may be cooled by a coolant introduced to the EGR cooler insertion part.

The gas tube may include a plurality of gas tubes and the plurality of gas tubes may be stacked to be parallel to a direction in which the gas tube is inserted into the EGR cooler insertion part.

A supply hole supplying a coolant to the EGR cooler insertion part may be formed in the cylinder block body.

The cylinder block body may include a plurality of cylinder chambers, and the water jackets may include a circulation flow channel heat-exchanged with all of the plurality of cylinder chambers and a direct flow channel heat-exchanged with any one of the plurality of cylinder chambers. The supply hole may be formed at a spot where the circulation flow channel and the direct flow channel meet.

In the EGR cooler, a first gasket may be disposed between the gas tube and the cover and a second gasket may be disposed between the gas tube and the EGR cooler insertion part.

Details of other exemplary forms are included in the detailed description and drawings.

The statements in this section merely provide background information related to the present disclosure and may not constitute prior art.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, the shapes and dimensions of elements may be exaggerated for clarity.

Figure 1:
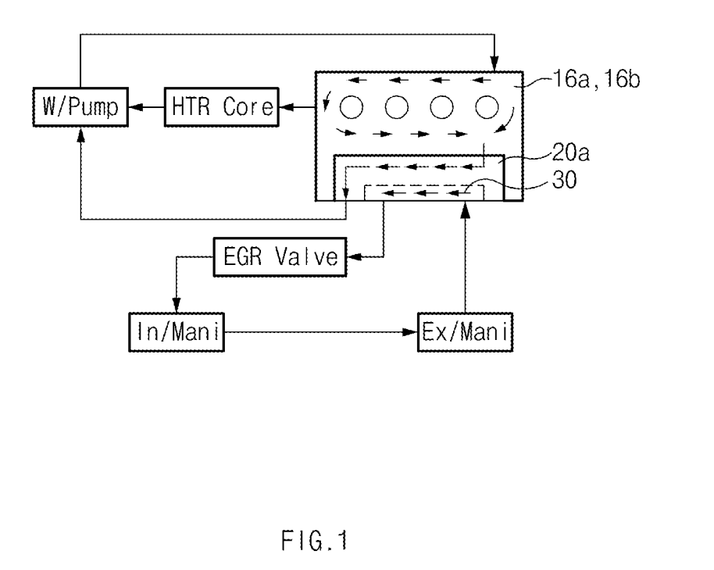
FIG. 1 a block diagram illustrating circulation of an exhaust gas of a vehicle engine and a coolant.
Figure 2:
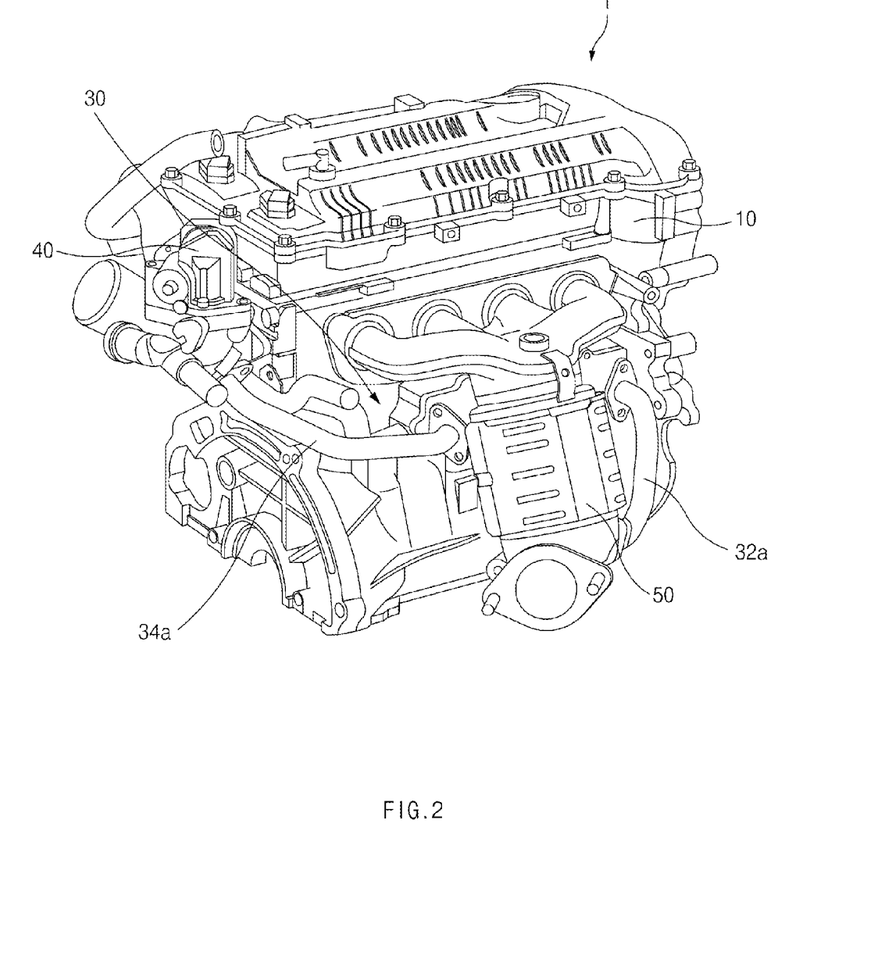
FIG. 2 is a perspective view illustrating a vehicle engine.

FIG. 1 is a block diagram illustrating circulation of an exhaust gas of a vehicle engine and a coolant according to one form of the present disclosure; FIG. 2 is a perspective view illustrating a vehicle engine; and FIG. 3 is a front view illustrating a vehicle engine.

Figure 3:
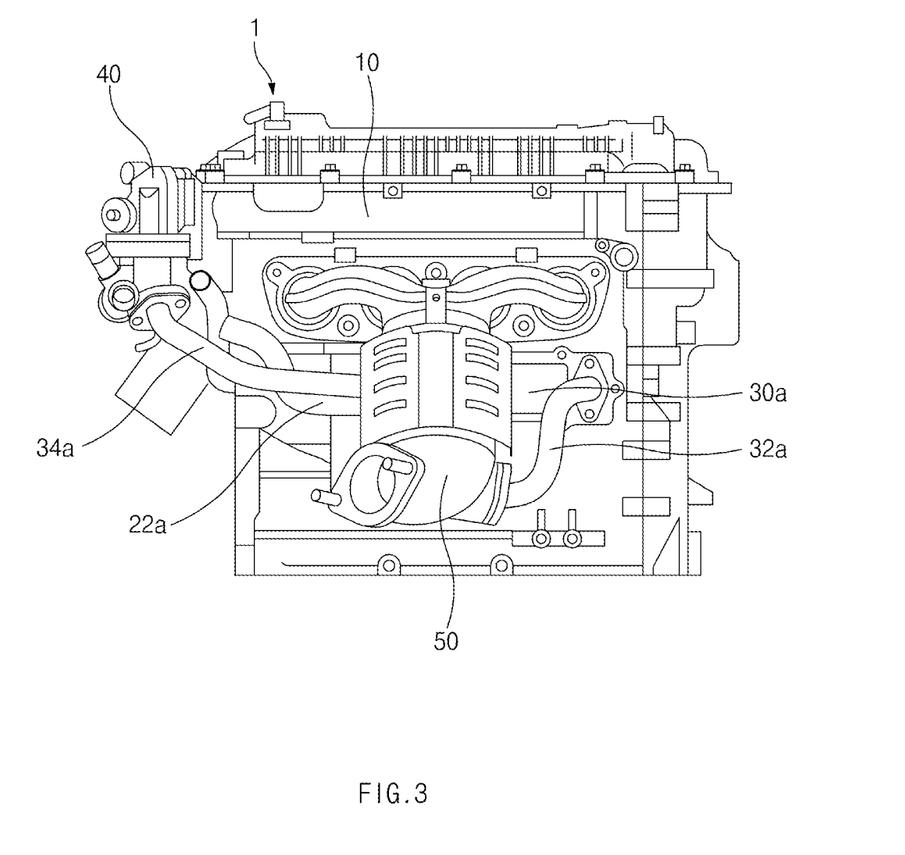
FIG. 3 is a front view illustrating a vehicle engine.

Referring to FIGS. 1 to 3, an apparatus for cooling a vehicle engine includes: a combustion chamber in which a piston reciprocates, water jackets 16a and 16b in which a coolant flows to cool the combustion chamber, and a cylinder block 1 forming a framework of an engine. The cylinder block 1 includes a cylinder block body 10 and an EGR cooler insertion part 20 formed outside of the cylinder block body 10 and allowing an EGR cooler 30 to be inserted therein. As a coolant is supplied to the EGR cooler insertion part 20, the cylinder block 1 may be heat-exchanged with the EGR cooler 30.

Figure 4:
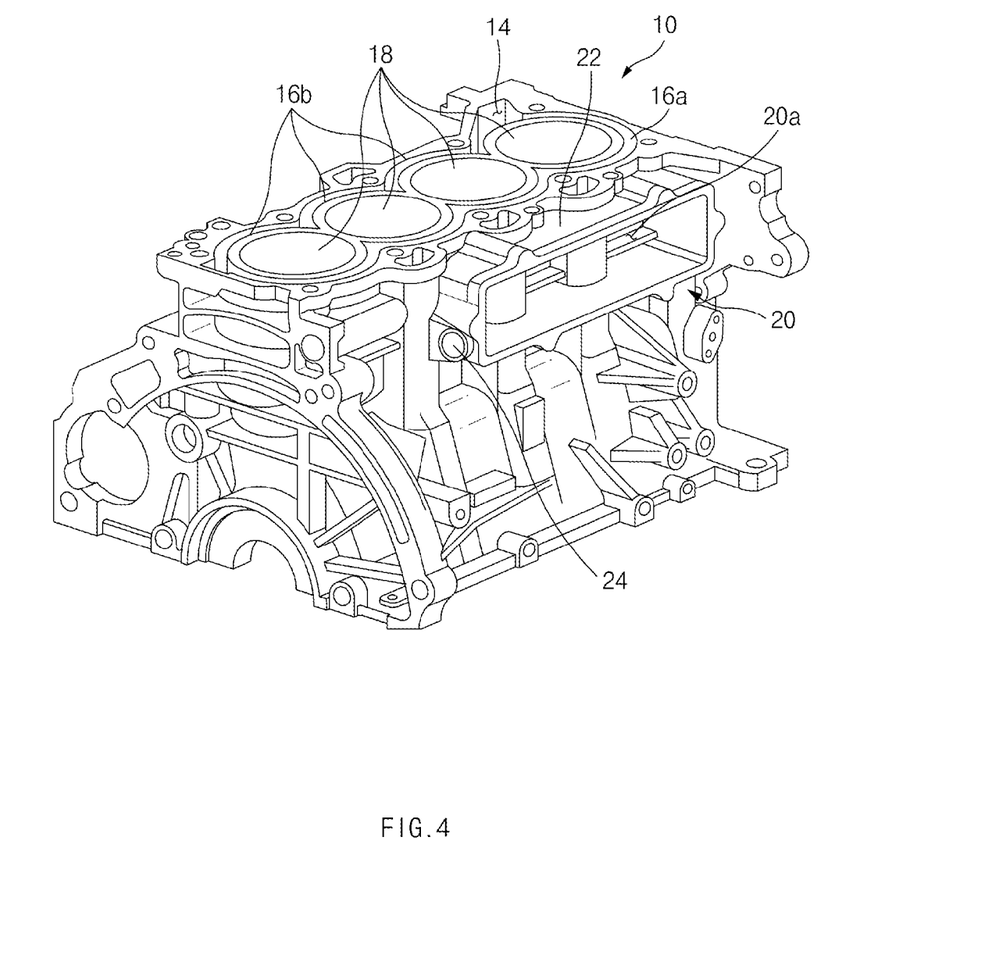
FIG. 4 is a perspective view illustrating a cylinder block body.

FIG. 4 is a perspective view illustrating a cylinder block body.

The apparatus for cooling a vehicle engine according to one form of the present disclosure will be described with reference to FIGS. 4 to 6. The cylinder block 1 includes a plurality of cylinder chambers 18 for installation of a piston, and the cylinder block body 10 in which the EGR cooler insertion part 20 into which the EGR cooler 30 is to be inserted is formed.

The cylinder block body 10 includes the plurality of cylinder chambers 18 formed in series in a lengthwise direction of the cylinder block body 10. The EGR cooler 30 may be disposed on the cylinder block 1 such that an exhaust gas of a vehicle may be heat-exchanged with the water jackets 16a and 16b. The EGR cooler 30 may be inserted into the EGR cooler insertion part 20. The EGR cooler insertion part 20 may be integrally formed in the lengthwise direction of the cylinder block body 10.

An inlet 14 allowing a coolant to be introduced therethrough may be formed in the cylinder block body 10. A supply hole 12 supplying a coolant introduced through the inlet 14 to the EGR cooler insertion part 20 may be formed in the cylinder block body 10.

In the cylinder block body 10, heat may be generated by a plurality of cylinders reciprocating vertically within the plurality of cylinder chambers 18. The cylinder block body 10 may be provided with the water jackets 16a and 16b to cool the plurality of cylinder chambers 18. The water jackets 16a and 16b may include a circulation flow channel 16b heat-exchanged with all of the plurality of cylinder chambers 18 and a direct flow channel 16a heat-exchanged with any one of the plurality of cylinder chambers 18.

The supply hole 12 may be formed at a spot where the circulation flow channel 16b and the direct flow channel 16a meet. The supply hole 12 may be formed as a through hole in a direction in which the EGR cooler 30 is inserted such that a coolant is discharged.

A coolant may be introduced to the water jackets 16a and 16b through the inlet 14 and circulate therein. A partial amount of the coolant introduced to the water jackets 16a and 16b may be discharged to the circulation flow channel 16b through the inlet 14. The water jackets 16a and 16b may have an arc shape surrounding the outer circumferences of the plurality of cylinder chambers 18 which perform heat-exchange.

Here, a central angle of the direct flow channel 16a may range from 90 degrees to 180 degrees. Te circulation flow channel 16b may be formed outside of the plurality of cylinder chambers 18 to heat-exchange with all of the plurality of cylinder chambers 18.

Figure 5:
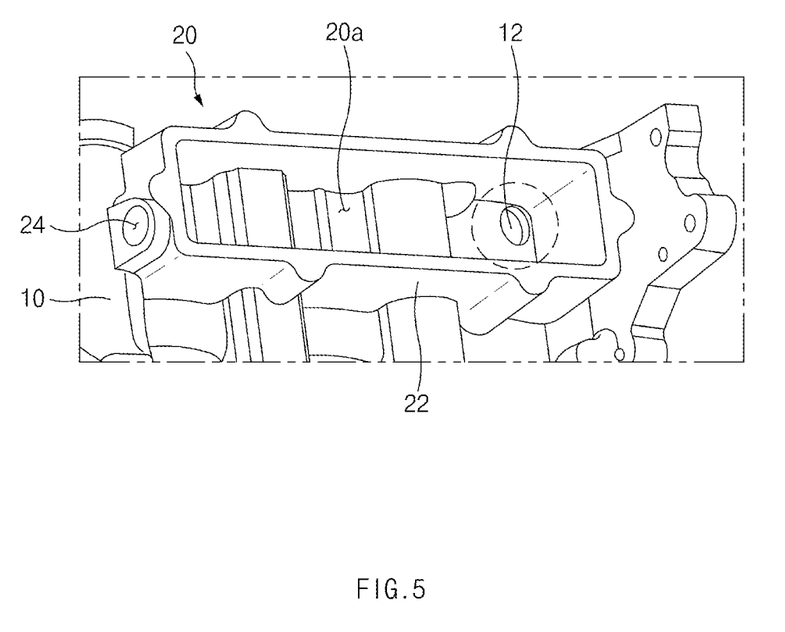
FIG. 5 is a perspective view illustrating an EGR cooler insertion part of the cylinder block body of FIG. 4, viewed from below.
Figure 6:
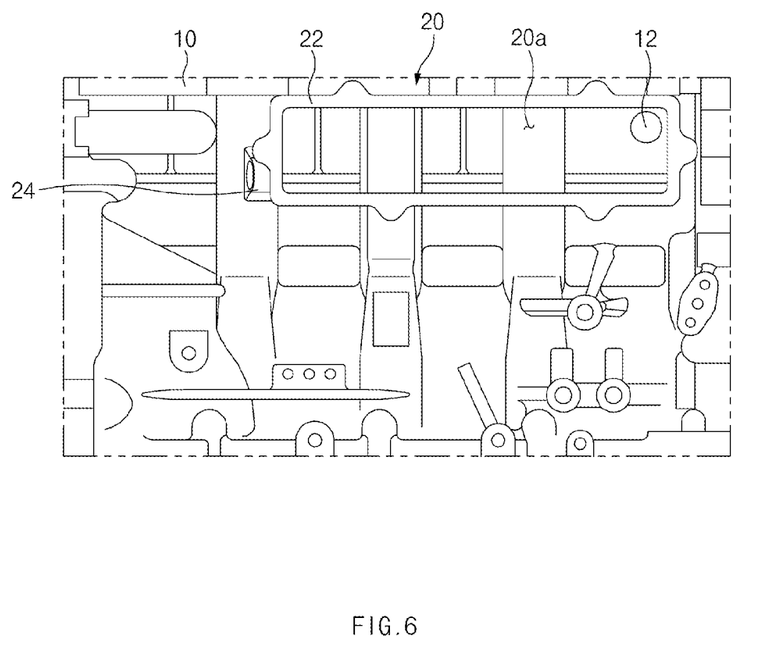
FIG. 6 is a front view illustrating the EGR cooler insertion part of the cylinder block body of FIG. 4.

FIG. 5 is a perspective view illustrating an EGR cooler insertion part of the cylinder block body of FIG. 4, viewed from below, and FIG. 6 is a front view illustrating the EGR cooler insertion part of the cylinder block body of FIG. 4.

The apparatus for cooling a vehicle engine will be described with reference to FIGS. 4 to 6. The EGR cooler insertion part 20 may be formed to extend horizontally in the lengthwise direction of the cylinder block body 10. The EGR cooler insertion part 20 has an EGR cooler insertion part body 22 formed to extend in a direction of the supply hole 12 in the cylinder block body 10.

A discharge hole 24 may be formed in the EGR cooler insertion part 20 and allow a coolant heat-exchanged with the EGR cooler 30 to be discharged therethrough. In one form, the discharge hole 24 may be formed in a side of the EGR cooler insertion part body 22.

An accommodation portion 20a may be formed within the EGR cooler insertion part body 22 in order to accommodate the EGR cooler 30. Here, the accommodation portion 20a may form a coolant flow channel 20a as the EGR cooler 30 is inserted therein.

Here, the discharge hole 24 may be formed such that a coolant is discharged in a direction perpendicular to a direction in which a coolant discharged from the supply hole 12 flows. The coolant discharged through the discharge hole 24 may be introduced to the cylinder block body 10 through a water pump, together with a coolant discharged through the circulation flow channel 16b.

Figure 7:
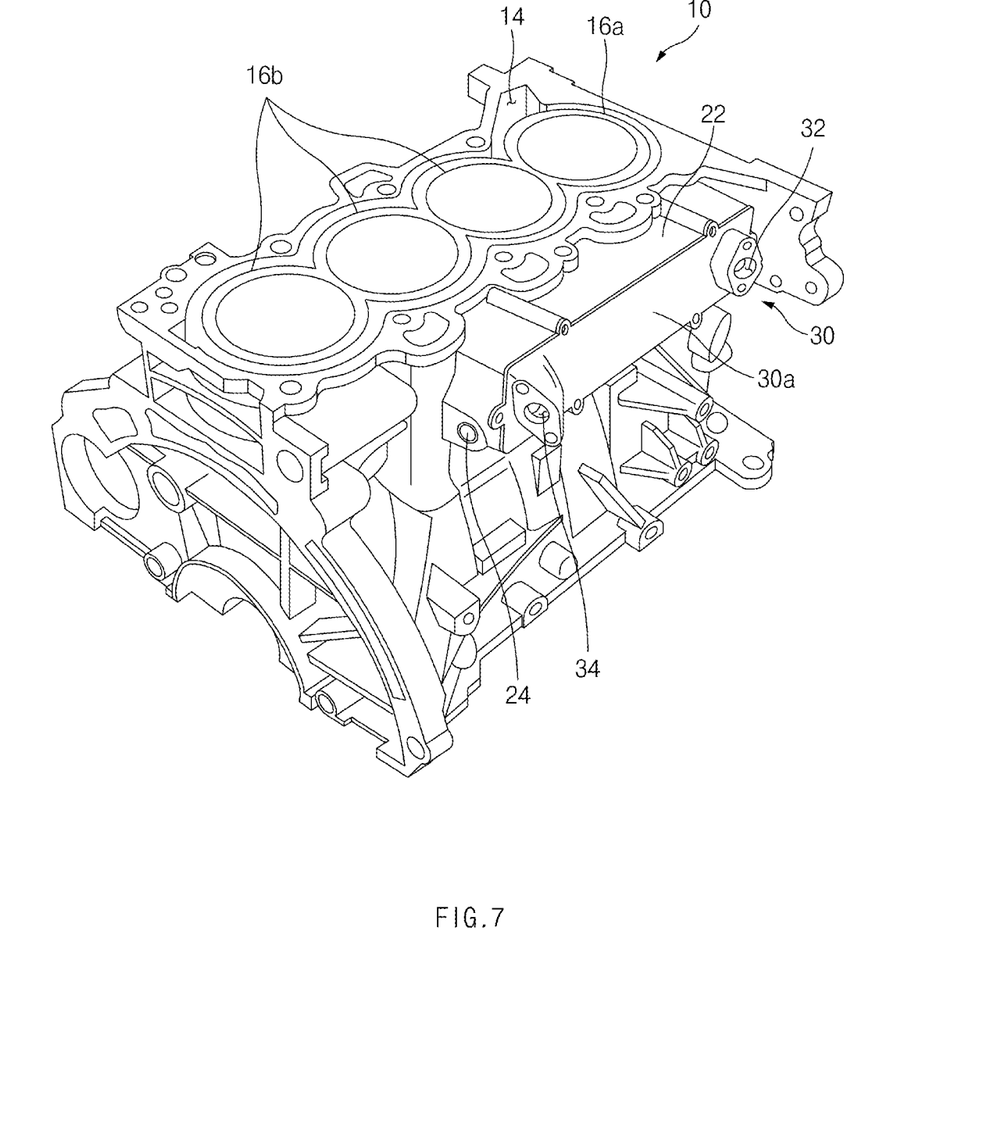
FIG. 7 is a perspective view illustrating the installation of an EGR cooler in a cylinder block body.
Figure 8:
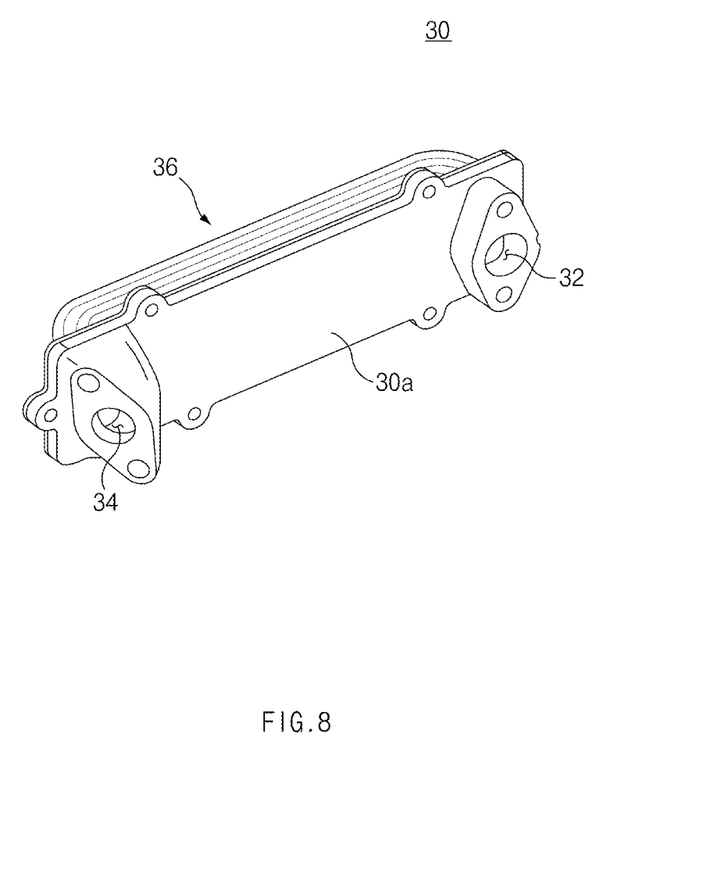
FIG. 8 is a perspective view illustrating an EGR cooler of an apparatus for cooling a vehicle engine.
Figure 9:
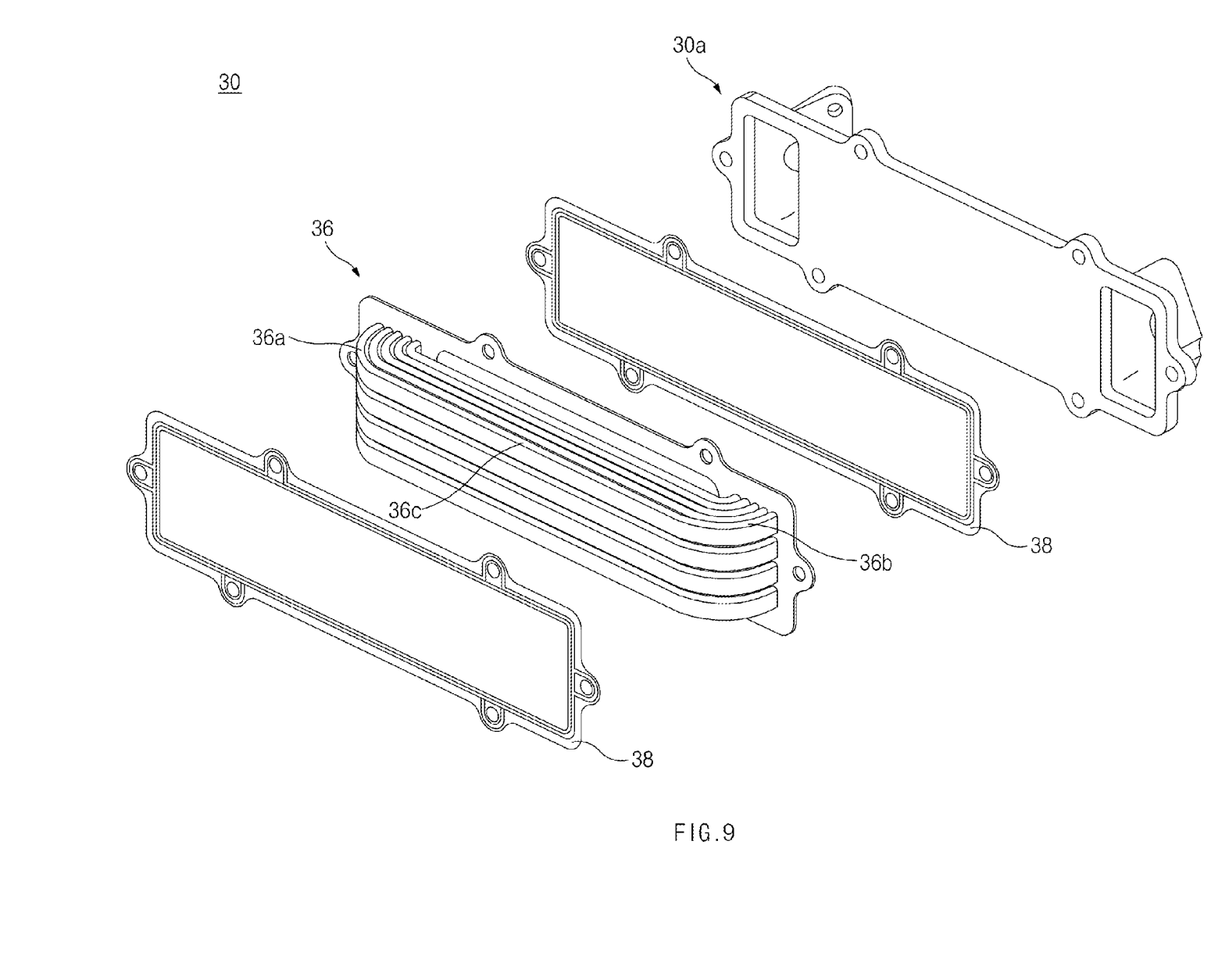
FIG. 9 is an exploded perspective view of the EGR cooler of FIG. 8.

FIG. 7 is a perspective view illustrating the installation of an EGR cooler in a cylinder block body; FIG. 8 is a perspective view illustrating an EGR cooler of an apparatus for cooling a vehicle engine according to the present disclosure; and FIG. 9 is an exploded perspective view of the EGR cooler of FIG. 8.

The apparatus for cooling a vehicle engine will be described with reference to FIGS. 7 to 9. The EGR cooler 30 may be disposed in the cylinder block 10 such that an exhaust gas flowing therein is subjected to heat-exchange with a coolant introduced through the inlet 14 from the combustion chamber 16. The EGR cooler 30 includes a cooler cover 30a covering the EGR cooler insertion part 20 and a gas tube 36 provided on the cooler cover 30a and heat-exchanged with a coolant.

The cooler cover 30a may be provided with the gas tube 36 including an intake port 36a through which an exhaust gas is introduced to the gas tube 36 and an exhaust port 36b through which the exhaust gas is discharged. The EGR cooler 30 may be heat-exchanged with an exhaust gas flowing in the gas tube 36 through a coolant introduced to the EGR cooler insertion part 20 to perform cooling.

The cooler cover 30a with the gas tube 36 mounted thereon may be inserted and fixed to the EGR cooler insertion part 20. A first through hole 32 connected to the intake port 36a and a second through hole 34 connected to the exhaust port 36b may be formed in the cooler cover 30a. The first through hole 32 may be formed to allow the intake port 36a and an exhaust manifold 32a of FIG. 3 to communicate with each other, and the second through hole 34 may be formed to allow the exhaust port 36b to communicate with an intake manifold 34a of FIG. 3. Accordingly, an exhaust gas introduced from the exhaust manifold 32a of FIG. 3 may flow through the gas tube 36, be cooled by a coolant, and be subsequently discharged to the intake manifold 34a through the exhaust port 36b.

The EGR cooler 30 may be inserted into the EGR cooler insertion part 20. The EGR cooler 30 may be inserted into the accommodation portion 20a of the EGR cooler insertion part 20. The EGR cooler 30 may be inserted into the accommodation portion 20a and be disposed to be spaced apart from an outer wall of the cylinder block body 10 by a predetermined interval to form the coolant flow channel 20a allowing a coolant to flow therein. The EGR cooler 30 may be heat-exchanged with the coolant flowing in the coolant flow channel 20a.

The gas tube 36 may be provided on the cooler cover 30a to cool an exhaust gas by a coolant. The gas tube 36 may cool an exhaust gas flowing therein by a coolant supplied to the EGR cooler insertion part 20. The gas tube 36 may be disposed in proximity of the cylinder block body 10.

The gas tube 36 includes a plurality of gas tubes and may have a U shape. The gas tube 36 includes the intake port 36a through which an exhaust gas is introduced, a heat exchange portion 36c bent and extending from the intake port 36a, and the exhaust port 36b bent from the heat exchange portion 36c and allowing the exhaust gas to be discharged. As the intake port 36a is connected to the first through hole 32 connected to the exhaust manifold 32a, an exhaust gas is introduced therethrough. As the exhaust port 36b is connected to the second through hole 34 connected to the intake manifold 34a, the exhaust gas introduced through the intake port 36a is discharged therethrough.

The plurality of gas tubes 36 may be provided to effectively perform heat exchange. The gas tubes 36 may be stacked to be parallel to a direction in which the gas tube 36 is inserted into the EGR cooler insertion part 20. A coolant may flow between valleys formed as the plurality of gas tubes 36 are stacked, and may be heat-exchanged to enhance a cooling rate.

Gaskets 38 may be provided on the front and rear of the gas tube 36 in order to inhibit leakage of a coolant. As the gaskets 38, a first gasket may be disposed between the gas tube 36 and the cooler cover 30a and a second gasket may be disposed between the gas tube 36 and the EGR cooler insertion part 20.

Referring back to FIGS. 2 and 3, the exhaust manifold 32a may be connected to a catalyst device 50, and an exhaust gas passing through the catalyst device 50 may be introduced to the EGR cooler 30. The catalyst device 50 may convert a gas harmful to a human body, included in the exhaust gas generated in the vehicle engine, into an unharmful component.

An EGR valve 40 may be installed at the second through hole 34 and disposed to be opened and closed such that an exhaust gas may flow under the control of the EGR valve 40 only in rotation thereof other than idle rotation and warm-up.

Operations of the apparatus for cooling a vehicle engine configured as described above and a cooling method thereof will be described hereinafter.

Figure 10:
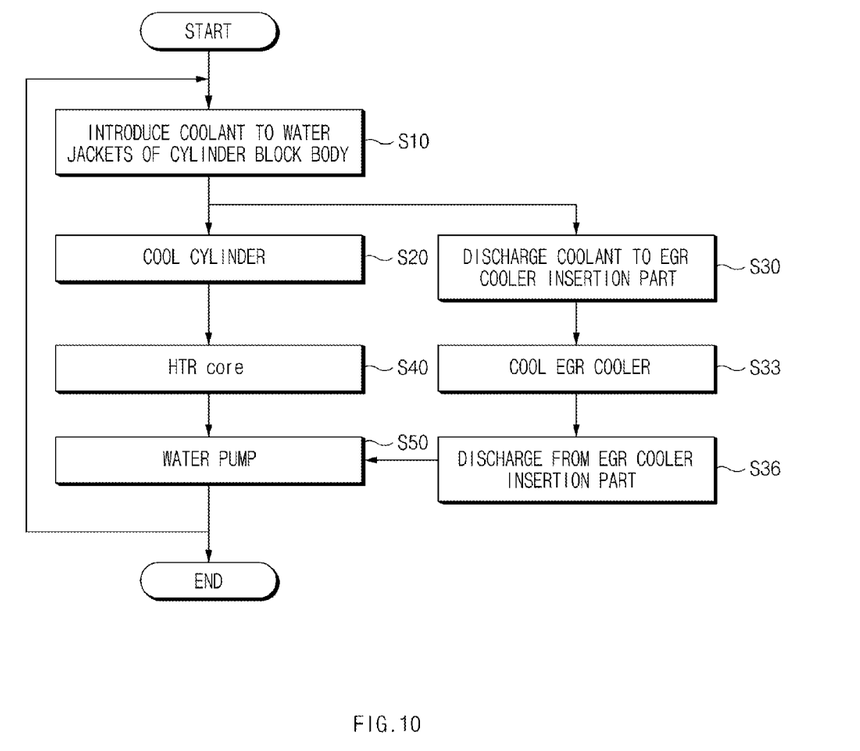
FIG. 10 is a flowchart illustrating a method for cooling a vehicle engine.

FIG. 2 is a perspective view illustrating a vehicle engine; FIG. 4 is a perspective view illustrating a cylinder block body; FIG. 7 is a perspective view illustrating the installation of an EGR cooler in a cylinder block body; and FIG. 10 is a flowchart illustrating a method for cooling a vehicle engine according to one form of the present disclosure.

The method for cooling a vehicle engine will be described with reference to FIGS. 2, 4, 7, and 10. While an engine is being started, the cylinder block body 10 may directly receive combustion gas heat having a high temperature, such that the temperature becomes high, and thus, the cylinder block body 10 is desired to have high thermal conductivity and a high cooling effect. Thus, in order to inhibit the cylinder block body 10 from being burnt, a coolant may be circulated within the cylinder block body 10. The coolant may be cooled through a heater core of a radiator and subsequently moved to the water jackets 16a and 16b of the cylinder block body 10 by a water pump (S10).

Here, the coolant may be introduced through the inlet 14 connected to the radiator and the water jackets 16a and 16b of the cylinder block body 10. The coolant may flow to the circulation flow channel 16b of the branched water jackets 16a and 16b (S20).

Accordingly, the coolant may be heat-exchanged with a portion of a cylinder head (not shown) and subsequently discharged to the supply hole 12. The coolant heat-exchanged with the cylinder head through the circulation flow channel 16b may be discharged to the outside of the cylinder block body 10 and flow to the heater core of the radiator (S40). The coolant discharged from the heater core may be supplied again to the water jackets 16a and 16b by the water pump, together with a coolant heat-exchanged with the EGR cooler 30, so as to be circulated (S50).

Here, according to another form, the coolant discharged from the heater core may be introduced to the water pump through a heater pipe.

Meanwhile, the coolant introduced to the water jackets 16a and 16b may flow to the direct flow channel 16a (S30). The coolant may be introduced to the supply hole 12 faster through the direct flow channel 16a than through the circulation flow channel 16b. The coolant introduced through the supply hole 12 may be heat-exchanged by the gas tube 36 of the EGR cooler 30 (S33). The coolant heat-exchanged with the EGR cooler 30 may be discharged through the discharge hole 24 (S36). The heat-exchanged coolant may be introduced again to the water jackets 16a and 16b together with the coolant which has passed through the circulation flow channel 16b via the water pump (not shown) (S36). Here, the coolant which has passed through the direct flow channel 16a may cool an exhaust gas flowing in the gas tube 36 of the EGR cooler 30.

As described above, since the EGR cooler 30 is integrally formed with the cylinder block body 10, a space (layout) for installation of the EGR cooler may be reduced. Also, since the EGR cooler 30 is inserted into the EGR cooler insertion part 20, vibration of a vehicle or vibration generated by a peripheral component such as an engine, or the like, may be reduced, and man-hour due to brazing of components may be reduced. In addition, since the cylinder head and the EGR cooler 30 are separately cooled, cooling efficiency may be enhanced.

As set forth above, the apparatus for cooling a vehicle engine and a cooling system thereof according to forms of the present disclosure have one or more advantages, as follows: first, vibration of a vehicle or vibration generated by a peripheral component such as an engine, or the like, may be reduced; second, a space (layout) for installation of the EGR cooler may be reduced and man-hour due to brazing of components may be reduced; and third, since the cylinder head and the EGR cooler are separately cooled, cooling efficiency may be enhanced.

Advantages and effects are not limited to the foregoing contents and any other technical effects not mentioned herein may be clearly understood by a person skilled in the art from the description of claims.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An apparatus for cooling a vehicle engine, the apparatus comprising:
    a combustion chamber in which a piston reciprocates;
    water jackets in which a coolant flows to cool the combustion chamber; and
    a cylinder block forming a framework of the vehicle engine,
    wherein the cylinder block comprises:
        a cylinder block body in which the combustion chamber is formed,
        an EGR cooler insertion part extended from the cylinder block body and forming an accommodation portion, and
        an exhaust gas recirculation (EGR) cooler mounted over the EGR cooler insertion part,
        wherein a supply hole is formed in the cylinder block body and configured to supply a coolant discharged from the combustion chamber to the accommodation portion of the EGR cooler insertion part such that the EGR cooler is heat-exchanged with the coolant discharged from the combustion chamber, and
    wherein the EGR cooler is provided with a gas tube inserted into the accommodation portion of the EGR cooler insertion part
    such that an exhaust gas of the gas tube is cooled by the coolant supplied to the EGR cooler insertion part.

2. The apparatus according to claim 1, wherein the gas tube is disposed in proximity of the cylinder block body.

3. The apparatus according to claim 2, wherein the gas tube comprises a plurality of gas tubes, and
    the plurality of gas tubes are stacked to be parallel to a direction in which the gas tube is inserted into the EGR cooler insertion part.

4. The apparatus according to claim 1, wherein the gas tube comprises a plurality of gas tubes and has a U shape.

5. The apparatus according to claim 1, wherein the gas tube comprises:
    an intake port through which an exhaust gas is introduced;
    a heat exchange portion bent and extending from the intake port; and
    an exhaust port bent and extending from the heat exchange portion and configured to allow the exhaust gas introduced through the intake port to be discharged.

6. The apparatus according to claim 5, wherein the EGR cooler includes a cooler cover covering the EGR cooler insertion part and the gas tube mounted on the cooler cover, and
    the cooler cover configured to communicate with the intake port and the exhaust port of the gas tube,
    wherein an exhaust gas flowing in the heat exchange portion is cooled by a coolant introduced to the EGR cooler insertion part.

7. The apparatus according to claim 1, wherein the cylinder block body includes a plurality of cylinder chambers,
    the water jackets include a circulation flow channel configured to be heat-exchanged with all of the plurality of cylinder chambers, and a direct flow channel configured to be heat-exchanged with any one of the plurality of cylinder chambers, and
    the supply hole is formed at a spot where the circulation flow channel and the direct flow channel meet.

8. The apparatus according to claim 6, wherein, in the EGR cooler, a first gasket is disposed between the gas tube and the cooler cover, and a second gasket is disposed between the gas tube and the EGR cooler insertion part.

9. A method for cooling a vehicle engine, the method comprising:
    introducing a coolant cooled by a radiator to a cylinder block body;
    introducing the coolant introduced to the cylinder block body to branched water jackets of the cylinder block body;
    supplying the coolant introduced to the water jackets to a combustion chamber of the cylinder block body in which a piston reciprocates and to an EGR cooler insertion part extended from the cylinder block body, the EGR cooler insertion part configured to form an accommodation portion; and
    exchanging heat by the coolant supplied from the water jackets to the accommodation portion of the EGR cooler insertion part through a supply hole formed in the cylinder block body, the accommodation portion configured to accommodate a gas tube of an EGR cooler where to which an exhaust gas flows,
    wherein, in the supplying of the coolant to the EGR cooler insertion part, the coolant introduced to the water jackets is branched to move toward a direct flow channel orienting the EGR cooler insertion part and a circulation flow channel configured to cool a plurality of cylinder chambers of the cylinder block body;
    wherein the coolant introduced to the water jackets is discharged through the supply hole along the direct flow channel, before being heat-exchanged.

10. The method according to claim 9, further comprising discharging, through a discharge hole of the EGR cooler insertion part, the coolant being heat-exchanged with the EGR cooler inserted into the EGR cooler insertion part, after the coolant is supplied to the EGR cooler insertion part.

11. The method according to claim 10, further comprising circulating the coolant which has flown through the circulation flow channel and the heat-exchanged coolant to the water jackets.

\* \* \* \* \*